United States Patent [19]

Lee et al.

[11] Patent Number: 4,569,964
[45] Date of Patent: Feb. 11, 1986

[54] HEAT/LIGHT STABLE INTERPENETRATING POLYMER NETWORK LATEXES

[75] Inventors: Do I. Lee, Midland, Mich.; Takayuki Kawamura, Tokyo, Japan; Edwin F. Stevens, Midland, Mich.

[73] Assignee: The Dow Chemical Company, Midland, Mich.

[21] Appl. No.: 546,025

[22] Filed: Oct. 27, 1983

[51] Int. Cl.$^4$ .............................. C08F 2/22; C08L 9/04
[52] U.S. Cl. .................................... 524/460; 524/522; 524/523; 524/458
[58] Field of Search ............... 524/458, 522, 523, 460

[56] References Cited

U.S. PATENT DOCUMENTS

| | | | |
|---|---|---|---|
| 4,002,801 | 1/1977 | Knechtges et al. | 428/474 |
| 4,206,105 | 6/1980 | Stafford | 260/29.6 |
| 4,265,977 | 5/1981 | Kawamura et al. | 524/458 |
| 4,302,553 | 11/1981 | Frisch et al. | 525/28 |
| 4,325,856 | 4/1982 | Ishikawa et al. | 524/458 |
| 4,448,923 | 5/1984 | Reeb et al. | 524/460 |
| 4,448,924 | 5/1984 | Reeb et al. | 524/460 |

FOREIGN PATENT DOCUMENTS 824263  11/1959  United Kingdom .

OTHER PUBLICATIONS

Sperling et al., "Latex Interpenetrating Polymer Networks", *Intern. J. Poly. Mater.*, 1972, vol. 1, pp. 331–341.

*Primary Examiner*—Paul R. Michl
*Assistant Examiner*—Alex H. Walker

[57] ABSTRACT

Structural latexes exhibit good heat and light stability and good physical properties. For example, a styrene/butadiene polymer network is polymerized in a continuous network comprising an essentially hydrophilic polymer. The microdomains of each polymer network within the latex particle are described as an interpenetrating polymer network.

11 Claims, No Drawings

HEAT/LIGHT STABLE INTERPENETRATING POLYMER NETWORK LATEXES

BACKGROUND OF THE INVENTION

This invention relates to stable aqueous latexes which exhibit improved heat and light stability, and good mechanical properties.

Aqueous dispersions of polymers, which are referred to in the art as latexes, are generally known to be useful, both alone and in various formulations, as coatings and impregnants. A wide variety of latexes of differing homopolymeric and copolymeric composition (such as styrene-butadiene copolymers, acrylic homopolymers and copolymers, vinylidene chloride homopolymers and copolymers, etc.) have been developed having specific chemical and/or mechanical properties for particular end use applications. For example, aqueous interpolymer latexes resulting from the emulsion polymerization of monovinylidene aromatic monomers, such as styrene; diolefins, such as butadiene; and monoethylenically unsaturated carboxylic acids, such as acrylic acid; are known to be particularly useful as film-forming binders for pigments in paper coating applications. See, for example, U.S. Pat. Nos. 3,399,080 and 3,404,116.

Unfortunately, however, in the custom designing of latexes having such specialized combinations of properties, the full range of flexibility which might be thought possible in theory (e.g., on the basis of the wide variety of known, desirable characteristics individually possessed by the numerous known classes and species of addition polymerizable monomeric ingredients) have proven not to be entirely attainable in practice by virtue of complicating factors. Such factors include the incompatibility as between the individual classes and/or species of the known monomeric materials; wide divergency of reactivity as between monomeric materials, and the like.

It is desirable that a latex exhibits substantial stability towards decomposition or discoloration upon exposure to heat and light. For example, styrene/butadiene type latexes do not exhibit good heat and light stability. However, it is desirable to incorporate styrene and butadiene into latexes as such latexes exhibit good elastomeric properties as well as other desirable physical properties such as elongation, tensil and modulus. In addition, it is often desirable to prepare ignition resistant latexes for some applications. Unfortunately, common latexes do not often exhibit substantial heat and light stability toward decomposition and especially toward discoloration.

In recognition of the foregoing difficulties, attempts have been made in the prior art to overcome, or to at least minimize such difficulties. For example, in U.S. Pat. No. 4,002,801, it is taught that certain reactive monomers which are not readily copolymerizable with other monomers can nevertheless be satisfactorily introduced to a latex particle by encapsulating or "overpolymerizing" the desired homopolymer or copolymer with a copolymer with which the desired reactive monomers are possible. Unfortunately, even such an improvement is not without disadvantages or limitations. For example, only certain types of encapsulating polymers are practicable, and there exists an upper limit upon the amount of polymer solids that can be thereby prepared without latex flocculation or coagulation.

As taught in U.S. Pat. No. 4,325,856, aqueous copolymer latexes are prepared comprising colloidally dispersed, substantially spheroidal copolymer particles having a predominantly hydrophobic core portion and a relatively hydrophilic polymeric portion which is preferentially oriented toward the outer surface thereof. Although such latexes provide desirable physical properties of various copolymerizable species, such latexes do not exhibit highly balanced physical properties.

Accordingly, it would be highly desirable to provide improved latexes and a process for making the same, by which polymers introducing desirable combinations of properties to said latexes can be dispersed within one another to yield a desirable balance of mechanical properties.

SUMMARY OF THE INVENTION

The present invention is a structured latex exhibiting both (a) heat and light stability and (b) good physical properties; wherein an essentially hydrophobic polymer domain comprising the polymerization product of at least one open chain conjugated diene monomer and/or at least one other hydrophobic monovinyl monomer is emulsion polymerized in a network comprising a polymerized, essentially hydrophilic polymer domain comprising at least one monovinyl monomer and, optionally, at least one polyvinyl crosslinking monomer such that said hydrophilic domain, when polymerized, results in a continuous phase; and said hydrophobic polymer domain results in a discontinuous but essentially mutually exclusive microdomain within each latex particle. By the term, "good physical properties" is meant that physical properties such as tensile, elongation and modulus approach those provided by a latex composed essentially of a hydrophobic polymer domain. That is, the unique properties of an IPN is a result of the combination of unique properties of the individual component polymers. The physical properties exhibited by an IPN are superior to those properties exhibited by blends of latexes, each of which introduce stability and good physical properties to the blend.

The structured latexes of this invention are broadly described as being interpenetrating polymer networks (IPNs) based on the two types of polymers, each in network form. For purposes of this invention, the morphology of each IPN latex particle is composed of microdomains of essentially hydrophobic polymer in an essentially continuous hydrophilic polymer phase.

The IPN latexes of this invention are useful where mechanically stable latexes have been previously used and where heat stability and ignition resistance are desirable. Uses include paper coatings, carpet backsizing, composite papers, fabric coatings, nonwoven materials, foil scrim kraft laminates, cement applications, and other known applications.

DETAILED DESCRIPTION OF THE INVENTION

An interpenetrating polymer network (IPN) is a unique type of polymer blend which can be defined as a combination of two polymers in essentially a network form. The compositions of this invention are prepared by incorporating monovinyl monomer(s) and optionally, though preferably, a conjugated diene crosslinking agent (Stage II mix) into an already existing, or at least partially exisiting, crosslinked polymer network (Polymer I), preferably by swelling, and then polymerizing the Stage II mix in situ (along with the further polymerization of the Polymer I network if necessary) to form a second polymer network (Polymer II). One polymer network is continuous throughout the composition and both networks are essentially chemically independent. The unique feature of the IPNs of this invention is that the networks are caused to interpenetrate each other within the latex (i.e., both networks extend through large regions of space forming microdomains).

Polymer I networks in the practice of this invention generally are those which exhibit excellent heat and light stability. Such heat and light stability is provided to the latex by the polymerization of monomers such as those which will, when polymerized, yield an essentially hydrophilic polymer.

Suitable monomers which can polymerize to yield such hydrophilic polymers include the acrylate and methacrylate monomers and, for example, hydroxyalkyl acrylates wherein the alkyl group contains from 2 to about 4 carbon atoms such as 2-hydroxyethyl acrylate or 3-hydroxypropyl acrylate; alkyl acrylates wherein the alkyl group contains from 1 to about 18 carbon atoms, such as methyl acrylate, ethyl acrylate, propyl acrylate, n-butyl acrylate, 2-ethylhexyl acrylate, etc., alkyl methacrylates, such as methyl methacrylate, ethyl methacrylate, propyl methacrylate, n-butyl methacrylate, and similar alkyl methacrylates.

Other monomers which are advantageously copolymerized in the preparation of the Polymer I include amides derived from $\alpha,\beta$-olefinically unsaturated carboxylic acids and include, for example, acrylamide, methacrylamide, N-methyl acrylamide, n-ethyl acrylamide, N-propyl acrylamide, N-(t-butyl)-acrylamide, N-(2-ethylhexyl)acrylamide, N-methyl methacrylamide, N-(t-butyl)methacrylamide, N-octyl methacrylamide, N,N-diethyl acrylamide, N,N-diethyl methacrylamide, diacetone acrylamide, and the like.

Other monomers can include the N-alkylol and N-alkoxyalkyl derivatives of the aforementioned olefinically unsaturated amides and include, for example, N-methylol acrylamide, N-ethanol methacrylamide, N-propanol acrylamide, N-methoxymethyl acrylamide, N-methoxyethyl acrylamide, N-butoxyethyl acrylamide, N-butoxymethyl methacrylamide, and the like. While the above-mentioned monomers are preferred because of their ready availability and low cost, other structurally related polymerizable amides, such as N-methylol maleamide, N-methylol maleimide, N-methylol-p-vinyl benzimide, the hydroxyalkyl derivatives of diacetone acrylamide, and the like, can also be employed.

Other monomers can include acrylonitrile, methacrylonitrile, vinyl acetate, vinyl formate, vinyl propionate, propylene, butylene, pentene, methylvinyl ether, ethyl vinyl ether, vinyl 2-methoxyl ethyl ether, vinyl 2-chloroethylether and the like.

Especially preferred other monomers include the $\alpha,\beta$-olefinically unsaturated carboxylic acids such as acrylic acid, methacrylic acid, vinyl benzoic acid, isopropenyl benzoic acid, $\alpha$-diloroacrylic acid, crotonic acid, sorbic acid, $\beta$-styryl acrylic acid, glutonic acid, aconitic acid, and the like.

Other especially preferred monomers include the monovinylidene aromatic monomers which include, for example, styrene, $\alpha$-methylstyrene, ortho-, meta- and para-methylstyrene, ortho-, meta- and para-ethylstyrene, o,p-dimethylstyrene, o,p-diethylstyrene, o-methyl-p-isopropylstyrene, p-chlorostyrene, p-bromostyrene, o,p-dichlorostyrene, o,p-dibromostyrene, and the like.

The polyvinyl crosslinking monomer for the purposes of this invention is a di- or polyfunctional ethylenically unsaturated monomer having at least one $\alpha,\beta$-ethylenically unsaturated vinyl group. The vinyl groups on the crosslinking monomer are the same such as, for example, in divinyl benzene, trimethyol propane triacrylate, etc.; or different such as, for example, in allyl methacrylate, diallyl fumarate, diallyl maleate, etc. Examples of other suitable crosslinking monomers include 1,3-butylene dimethacrylate, diethylene glycol dimethacrylate, ethylene glycol dimethacrylate, trimethylolpropane trimethacrylate, methylene bisacrylamide, diethylene glycol diacrylate, ethylene glycol diacrylate, divinyl ether, diallyl phthalate, triethylene glycol dimethacrylate, trimethylene glycol diacrylate, butylene glycol diacrylate, pentamethylene glycol diacrylate, glyceryl triacrylate, octylene glycol diacrylate, trimethylolpropane triacrylate, the tetraacrylate ester of pentaerythritol, and the like.

Polymer II networks in the practice of this invention exhibit excellent elastomeric properties, ignition resistance, or other desirable mechanical properties to the latex. In particular, such properties are provided by selecting the proper monomers which can be polymerized with suitable crosslinking monomers such as the aliphatic conjugated diene monomers.

The open chain conjugated diene monomers typically contain from 4 to about 9 carbon atoms and such monomers include 1,3-butadiene, 2-methyl-1,3-butadiene, 2,3-dimethyl-1,3-butadiene, pentadiene 2-neopentyl-1,3-butadiene and other hydrocarbon analogs of 1,3-butadiene, and in addition, the substituted 1,3-butadienes such as 1-chloro-1,3-butadiene; 2-cyano-1,3-butadiene; the substituted straight chain conjugated pentadienes; the straight and branched chain conjugated hexadienes; other straight chain and branched chains conjugated dienes preferably having from 4 to about 9 carbon atoms and comonomeric mixtures thereof. The 1,3-butadiene hydrocarbon monomers such as those mentioned hereinbefore provide polymers having particularly desirable properties and are therefore preferred with 1,3-butadiene the most preferred.

Suitable monomers employed in the Stage II mix include the aforementioned monovinylidene aromatic monomers, and vinyl halide or vinylidene halide monomers (hereinafter simply referred to as vinyl halide monomers). Suitable halogens are selected from the group consisting of chloro, bromo and fluoro. Especially useful vinyl halide monomers include vinyl chloride and vinylidene chloride, and may be employed individually or in combination.

When the Polymer II exhibits "soft" characteristics (i.e., a Tg of about 25° C. or less), the physical properties such as moduli of elasticity and tensile strength which are exhibited by the IPN are essentially those exhibited by the Polymer I network. However, if Polymer II exhibits very "hard" character (i.e., Tg of 80° C. or more), the corresponding physical properties are dominated by the Polymer II character, and are essentially independent of Polymer I. Further, the IPN latexes show better heat stability in terms of color and flexibility. Such a behavior is expected in view of the fact that the Polymer I constituents are heat stable and maintain good flexibility. In practice, as the Polymer II constituents degrade, less discoloration is shown because it is believed that degradation within the small microdomains is less pronounced than that exhibited in a large homogeneous domain.

Polymer I networks generally comprise (1) from about 50 to about 100, preferably about 60 to about 80, weight percent acrylate or alkylacrylate monomers, (2) from about 0 to about 50, preferably about 20 to about 40, weight percent monovinyl aromatic monomer, (3) from about 0 to about 10, preferably about 2 to about 8, weight percent other vinyl monomer, preferably an unsaturated carboxylic acid, and (4) about 0 to about 2, preferably about 0.2 to about 1, weight percent polyvinyl crosslinking monomer.

Polymer II networks generally comprise (1) from about 0 to about 100, preferably about 50 to about 80, weight percent monovinylidene aromatic monomers, and (2) from about 0 to about 100, preferably about 20 to about 50, weight percent open chain conjugated diene monomer; or (1) about 0 to about 100, preferably about 50 to about 80, weight percent vinylidene chloride, and (2) about 0 to about 100, preferably about 20 to about 50 weight percent conjugated diene monomer.

In the modes of preparing the latexes of the invention, the individual polymerization stages are most preferably conducted pursuant to conventional emulsion polymerization techniques. Thus, for example, the monomers to be employed in the particular stage involved are typically dispersed, with agitation sufficient to emulsify the mixture, in an aqueous medium which may contain known emulsifying agents (i.e., surfactants) as well as other ingredients conventionally employed in the art as polymerization aids (e.g., conventional chain transfer agents, etc.). Such monomers are then subjected to polymerization with the aid of a conventional source for generating free radicals (i.e., conventional free radical polymerization catalysts, activating radiation, etc.).

Free radical polymerization catalysts suitable for use in the foregoing polymerization stages include those already known to promote emulsion polymerization. Among such catalysts are oxidizing agents such as organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and catalysts which, like redox catalysts, are activated in the water phase, for example, by a water-soluble reducing agent.

Such catalysts are employed in an amount sufficient to cause polymerization (i.e., in a catalytic amount). As a general rule, an amount ranging from about 0.01 to about 5 weight percent based upon the total monomer to be polymerized is sufficient. Alternatively, other free radical producing means, such as exposure to activating radiations, can be employed rather than heat and/or catalytic compounds to activate the polymerization.

Suitable emulsifying agents which can be employed include the anionic, cationic, and nonionic emulsifiers customarily used in emulsion polymerization. Usually at least one anionic emulsifier is included and one or more nonionic emulsifiers can also be present. Representative types of anionic emulsifiers are the alkyl aryl sulfonates, alkali metal alkyl sulfates, the sulfonates alkyl esters, the fatty acid soaps and the like. Specific examples of these well known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. Such emulsifying agents can be employed in varying amounts so long as adequate emulsification is achieved to provide dispersed polymer particles having the desired particle size and particle size distribution. However, as a general rule, an amount ranging from about 0.01 to about 5 weight percent, based upon the total monomer to be polymerized, is advantageously employed. It should be noted, however, that it is preferable that no (or only small amounts of) emulsifying agents are added in the aforementioned second stage polymerization. This feature is desirable in order that the majority of the second stage polymer is formed on or around existing first stage polymer particles rather than initiating substantial amounts of homogeneous second stage polymer particles.

Optionally, conventional seeding procedures can be employed in the first stage polymerization to aid in control of such polymerization and in achieving the desired average particle size and particle size distribution for the dispersed second stage copolymer particles. When used, the seed particles are typically employed in amounts corresponding to from aboug 0.1 to about 1 weight percent of the core comonomers. Generally such seed particles range in size from about 10 to about 20 percent of the diameter of the IPN latex particles to be formed. The monomeric composition of the seed latex can vary so long as it does not coagulate during formation of the Stage I polymer particles.

As has been noted, conventional chain transfer agents can also be employed in the practice of the present invention and, indeed, in polymerization stages employing an aliphatic conjugated diene, it is preferable to do so. Examples of such conventional chain transfer agents include bromoform, carbon tetrachloride, long chain mercaptans (e.g., lauryl mercaptan, dodecyl mercaptan, etc.), or other known chain transfer agents. Conventional amounts (e.g., from about 0.1 to about 30 weight percent based on the total monomer charge) of such chain transfer agents are typically employed in such preferred embodiments.

Other ingredients known in the art to be useful for various specific purposes in emulsion polymerization can also be employed in the aforementioned polymerization stages. For example, when the polymerizable constituents for a given polymerization stage include a monoethylenically unsaturated carboxylic acid monomer, polymerization under acidic conditions (e.g., the aqueous media having a pH value of from about 2 to about 7, especially from about 2 to about 5) is preferred. In such instances, the aqueous medium can include acids and/or salts to provide the desired pH value and possible a buffered system. On the other hand, when a monoethylenically unsaturated carboxylic acid monomer is not employed, the pH of the aqueous medium can conveniently range from about 2 to about 10.

The following general procedure is preferably employed in making the IPN latexes of the present invention. A reactor is used which is equipped with a appropriate agitator or stirrer. The reactor is also equipped with an injection device for adding initiators at the beginning and during the reaction. Premix tanks are employed in conjunction with the reactor and are connected thereto. For example, one tank is employed for premixing the monomers, and the other for premixing the initiators, emulsifiers, etc.

The reactor is charged with water (most preferably distilled and treated with a chelating agent to remove metal ions) and purged with nitrogen or other inert gas to remove the oxygen therefrom. Preferably, a polymer seed is added to the aqueous phase.

In the first premix tank, the monomer mix is prepared. In the second premix tank, water, emulsifiers, initiators, and optional chelating agents, etc. are added.

The reactor temperature during polymerization is in the range of about 30° C. to about 100° C., most preferably from about 60° C. to about 90° C. Each of the premixtures is simultaneously or continuously added and the monomers is allowed to react for a period from less than one hour to about 6 hours.

After the initial monomer charge has been allowed to react, preferably with agitation, the Polymer I can be subjected to further polymerization conditions. In a manner similar to that employed in preparing the Polymer I, to each of the premix tanks are added the Stage II monomer mix and the aqueous mixture. The contents of each of the tanks are simultaneously or continuously added, and allowed to react. Reaction will be completed in about 3 to about 10 hours. The reactor is then cooled and the latex is filtered in order to remove any coagulum formed during the initial polymerization and during the second polymerization.

Suitable particle sizes for the latex resulting from such a process are generally obtained directly from such a polymerization process. Latexes generally range in size from about 0.05 to about 0.4, preferably about 0.08 to about 0.3, most preferably about 0.1 to about 0.25, micrometer in diameter.

Following polymerization, the solids content of the resulting aqueous polymer latex can be adjusted to the level desired by adding water thereto or by distilling water therefrom. Generally, such desired level of polymeric solids content is from about 30 to about 65 weight percent on a total weight basis.

The preferred IPN latexes comprise from about 20 to about 90, most preferably about 25 to about 75, weight percent Polymer I, and from about 10 to about 80, most preferably about 25 to about 75, weight percent Polymer II. It is necessary that Polymer I be a predominantly hydrophilic polymer in order for IPN latexes to form. A predominantly hydrophobic Polymer I will tend to act as a seed which will be encapsulated by hydrophilic polymers leading to an undesirable core-shell structure. It is also desirable that the Polymer I form the more continuous phase of the IPN. This ensures good heat and light stability of the resulting IPN latex. Even through the Polymer II network is preferably a less continuous phase (i.e., a smaller microdomain), it does form a network which provides a desirable balance of mechanical properties.

IPN latexes exhibit tensile strengths which are essentially independent of the amount of Polymer I and Polymer II. However, an IPN having a Polymer I composition of less than about 30 weight percent, and a Polymer II composition of greater than about 70 weight percent exhibits varying tensile strength as the amount of Polymer II increases. This suggests a more continuous Polymer II phase beyond such a point.

The IPN latexes, because of the two independently continuous microdomains, exhibit a unique polymer compatibility. The microdomains do not undergo gross phase separation upon the introduction of heat to the latex. However, depending upon the amount of each polymer stage, the latex can exhibit two distinct but intermediate Tgs.

In addition, it is sometimes desirable to have small amounts of certain known additives incorporated in the latex. Typical examples of such additives are surfactants, bacteriocides (e.g., formaldehyde), neutralizers, antifoamers, etc. Such additives can be incorporated into the latexes of the invention in a conventional manner and at any convenient point in the preparation of such latexes.

The aqueous IPN latexes of the present invention are suitable for use in a variety of applications such as, for example, in carpet backsizing, as binders in paper coating formulations, as binders for asbestos, as adhesives for binding together various types of substrates as free films and nonwoven fibers, as film-forming components for protective and/or decorative coatings (e.g., paints, etc.), and the like. The use of such latexes in the foregoing applications is pursuant to the techniques conventional in the respective arts. Latexes employed in preparing films can be cured at fairly high temperatures. The products or articles resulting from the foregoing uses of the IPN latexes of this invention possess notably improved stability towards decompositon and/or discoloration (e.g., upon exposure to heat and light) relative to similar products employed conventional latexes of similar monomers.

The following example is intended to illustrate the invention and is not intended to limit the scope thereof. In the example, all parts and percentages are by weight unless otherwise specified.

EXAMPLE 1

Into a stainless steel jacketed reactor is charged 944.76 g of deionized water, 36 g of a 1 percent solution of a chelating agent, and 38.8 g of a 30.8 percent polystyrene polymer seed having an average diameter of 280 Å. The reactor is purged with nitrogen and heated under agitation to 90° C.

A monomer mix comprises 780 g of butyl acrylate (65 parts), 372 g of styrene (31 parts), 48 g of acrylic acid (4 parts) and 2.4 g of allyl methacrylate (0.2 part). This monomer mix is continuously added to the reactor at a rate of 400.8 g per hour for 3 hours.

An aqueous mix comprises 480 g of deionized water, 26.6 g of a 45 percent surfactant, 18 g of a 10 percent sodium hydroxide solution and 8.4 g sodium persulfate. This aqueous mix is continuously added to the reactor as the monomer mix is added, but at a rate of 133.25 g per hour for 4 hours.

The mixture is allowed to cool down for an additional hour after all of the ingredients have been added to the reactor. The resulting product is 44.9 percent solids, at a pH of about 3.6, having very low residual monomer, 0.05 g of residue and an average particle diameter of 1310 Å.

Into a reactor as previously described is charged 681.96 g of deionized water and 846 g of the polymer mixture described previously. The mixture is purged with nitrogen and heated under agitation at 90° C.

A monomer mix comprises 420 g of styrene and 420 g of butadiene. This mix is continuously added to the reactor at a rate of 300 g per hour for 2.8 hours.

An aqueous mix comprises 345.6 g of deionized water, 19.2 g of a 45 percent surfactant, 12.96 g of a 10 percent sodium hydroxide solution and 6 g of sodium persulfate. This aqueous mix is continuously added, but at a rate of 106.6 g per hour for 3.6 hours.

The mixture is allowed to cool down for an additional 1.2 hours after all of the ingredients have been added to the reactor. The resulting product is 44.65 percent solids, at a pH of 3.4, having a very low residual monomer, 0.33 residue and an average particle size of 1895 Å.

What is claimed is:

1. An interpenetrating polymer network latex exhibiting both (a) heat and light stability and (b) good mechanical properties; wherein an essentially hydrophobic polymer domain comprising the polymerization product of at least one open chain conjugated diene monomer and/or at least one other hydrophobic monovinyl monomer is emulsion polymerized in a crosslinked polymer network comprising a polymerized, essentially hydrophilic polymer domain consisting essentially of at least one monovinyl monomer and at least one polyvinyl crosslinking monomer such that said hydrophilic domain, when polymerized, results in a continuous phase; and said hydrophobic polymer domain results in a discontinuous but essentially mutually exclusive microdomain within each latex particle.

2. A latex of claim 1 wherein said hydrophilic polymer network comprises (1) from about 50 to about 100 weight percent acrylate or methacrylate monomers, (2) from about 0 to about 50 weight percent monovinyl aromatic monomer, (3) from about 0 to about 10 weight percent other vinyl monomer, and (4) about 0 to about 2 weight percent polyvinyl crosslinking monomer.

3. A latex of claim 2 wherein said other vinyl monomer is an unsaturated carboxylic acid.

4. A latex of claim 1 wherein said hydrophilic polymer network comprises (1) from about 50 to about 80 weight percent acrylate or methacrylate monomers, (2) from about 20 to about 40 weight percent monovinyl aromatic monomer, (3) from about 2 to about 8 weight percent other vinyl monomer, and (4) about 0.2 to about 1 weight percent polyvinyl crosslinking monomer.

5. A latex of claim 4 wherein said other vinyl monomer is an unsaturated carboxylic acid.

6. A latex of claim 1 wherein said hydrophobic polymer network domain comprises (1) from about 0 to about 100 weight percent monovinyl aromatic monomer and (2) from about 0 to about 100 weight percent open chain conjugated diene.

7. A latex of claim 1 wherein said hydrophobic polymer network domain comprises (1) from about 50 to about 80 weight percent monovinyl aromatic monomer and (2) from about 20 to about 50 weight percent open chain conjugated diene.

8. A latex of claim 1 wherein said hydrophobic polymer network domain comprises (1) from about 0 to about 100 weight percent vinyl halide monomer and (2) from 0 to about 100 weight percent open chain conjugated diene.

9. A latex of claim 1 wherein said hydrophobic polymer network domain comprises (1) from about 25 to about 75 weight percent vinyl halide monomer and (2) from 25 to about 75 weight percent open chain conjugated diene.

10. A latex of claim 1 comprising from about 20 to about 90 weight percent of said hydrophilic polymer network and from about 10 to about 80 weight percent of said hydrophobic polymer domain.

11. A latex of claim 1 comprising from about 25 to about 75 weight percent of said hydrophilic polymer network and from about 25 to about 75 weight percent of said hydrophobic polymer domain.

* * * * *